United States Patent
Wilson et al.

(10) Patent No.: US 12,069,014 B2
(45) Date of Patent: *Aug. 20, 2024

(54) SYSTEM FOR GENERATING AUTOMATED RESPONSES FOR ISSUE TRACKING SYSTEM AND MULTI-PLATFORM EVENT FEEDS

(71) Applicants: Atlassian Pty Ltd., Sydney (AU); Atlassian US, Inc., San Francisco, CA (US)

(72) Inventors: David Wilson, Sydney (AU); Joshua Carolan, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,354

(22) Filed: Mar. 10, 2023

(65) Prior Publication Data

US 2024/0056405 A1 Feb. 15, 2024

Related U.S. Application Data

(63) Continuation of application No. 17/710,148, filed on Mar. 31, 2022, now Pat. No. 11,606,321.

(51) Int. Cl.
*H04L 51/046* (2022.01)
*G06Q 10/0631* (2023.01)
*H04L 51/02* (2022.01)
*H04L 51/224* (2022.01)

(52) U.S. Cl.
CPC .... *H04L 51/046* (2013.01); *G06Q 10/063114* (2013.01); *H04L 51/02* (2013.01); *H04L 51/224* (2022.05)

(58) Field of Classification Search
None
See application file for complete search history.

(56) References Cited

U.S. PATENT DOCUMENTS

| 8,356,650 B2 * | 1/2013 | Takahashi | B65H 39/16 156/549 |
| 8,380,710 B1 * | 2/2013 | Finne | G06F 16/958 707/723 |
| 8,510,397 B2 * | 8/2013 | Chapman | H04M 7/0024 709/219 |

(Continued)

*Primary Examiner* — Backhean Tiv
(74) *Attorney, Agent, or Firm* — Brownstein Hyatt Farber Schreck, LLP

(57) ABSTRACT

Embodiments include methods for generating automated responses to event feed items in a multiplatform collaboration system. The methods can include receiving event notifications for events generated at a respective application service of a set of applications services, rendering a set of event cards corresponding to the events, and identifying a subset of event cards that include an update to a comment field. Methods include generating, for each event card in the subset of event cards, a comment field and causing the client device to display event cards of the set of event cards in an event feed. Methods include a, in response to a user selecting a reply option in an event card, causing the client device to launch an application platform associated with the application service and generate a response interface including a pre-populated response comment.

20 Claims, 9 Drawing Sheets

(56) References Cited

U.S. PATENT DOCUMENTS

| | | | | |
|---|---|---|---|---|
| 8,760,281 | B1* | 6/2014 | Rana | G06Q 10/10 705/14.27 |
| 9,049,259 | B2* | 6/2015 | Rathod | H04L 65/403 |
| 9,326,030 | B2* | 4/2016 | Lewis | H04W 4/50 |
| 9,501,531 | B2* | 11/2016 | Sinha | H04L 67/63 |
| 9,898,172 | B2* | 2/2018 | Hu | G06F 9/451 |
| 10,135,776 | B1* | 11/2018 | Brown | G06Q 50/01 |
| 10,248,933 | B2* | 4/2019 | Pai | G06Q 10/101 |
| 10,454,695 | B2* | 10/2019 | Viera | G06F 40/169 |
| 10,621,262 | B2* | 4/2020 | Lemp | H04L 67/55 |
| 10,726,093 | B2* | 7/2020 | Chatterjee | G06F 16/9574 |
| 10,810,204 | B2* | 10/2020 | Darrow | G06Q 10/107 |
| 10,810,241 | B2* | 10/2020 | Hughes | G06F 40/186 |
| 11,005,957 | B2* | 5/2021 | Horen | H04L 67/10 |
| 11,394,790 | B2* | 7/2022 | Felder | G06Q 50/01 |
| 11,606,321 | B1* | 3/2023 | Wilson | H04L 51/224 |
| 11,606,614 | B1* | 3/2023 | Dasdan | H04N 21/4668 |
| 2006/0155698 | A1* | 7/2006 | Vayssiere | H04M 3/53366 |
| 2011/0202544 | A1* | 8/2011 | Carle | H04L 67/52 707/754 |
| 2013/0125188 | A1* | 5/2013 | Mandalia | H04N 21/4333 386/E5.028 |
| 2014/0101780 | A1* | 4/2014 | Zuber | G06Q 40/02 726/28 |
| 2016/0371737 | A1* | 12/2016 | Lewis | G06Q 50/01 |
| 2019/0189291 | A1* | 6/2019 | Batterton | G16H 80/00 |
| 2020/0090104 | A1* | 3/2020 | Mandviwalla | G06Q 10/06393 |
| 2022/0100734 | A1* | 3/2022 | Geeves | G06Q 10/103 |

* cited by examiner

SYSTEM FOR GENERATING AUTOMATED RESPONSES FOR ISSUE TRACKING SYSTEM AND MULTI-PLATFORM EVENT FEEDS

CROSS-REFERENCE TO RELATED APPLICATION(S)

This application is a continuation patent application of U.S. patent application Ser. No. 17/710,148, filed Mar. 31, 2022 and titled "System for Generating Automated Responses for Issue Tracking System and Multi-Platform Event Feeds," the disclosure of which is hereby incorporated herein by reference in its entirety.

FIELD

The described embodiments relate to event feeds for one or more collaboration platforms and, in particular, to systems and methods for redirecting a graphical user interface to designated portions of content items in response to user input provided to the event feed.

BACKGROUND

Organizations are increasingly using various software products to facilitate communication and workflow between individuals and teams. In many cases these software products will have both desktop and mobile versions. The desktop version may include a user interfaces and interaction schemes that are different from the mobile application. For example, the desktop version of a software product may include more detailed user interfaces, a greater selection of tools, etc. due to the larger size of most desktop displays. The mobile version of the product may allow a user to view summaries or other higher-level details on projects hosted by the software product. In many cases, an important function of the mobile version may be to provide a user with updates, alerts or other notifications for one or more projects. The systems and examples described herein are directed to techniques for facilitating user input and providing relevant context for a user having a limited display area of some traditional mobile devices.

SUMMARY

Embodiments are directed to methods for generating automated responses to an issue event displayed on a feed card of a multiplatform event feed. The methods can include receiving a set of event communications, where each event communication corresponds to an event generated at an issue tracking service, and each event communication includes issue information for an issue associated with the event and event information indicating a change to the corresponding issue. The methods can include rendering a set of event cards, where each event card corresponds to an issue item generated at the issue tracking service, and each event card includes issue information and event information. The rendering can include identifying a subset of event cards of the set of event cards, where the subset of event cards corresponds to events that comprise a comment entered in a comment field of the corresponding issue, and generating, for each event card in the subset of event cards, a reply field comprising the comment and an option to reply to the comment. In response to receiving a request to view an event feed from a client device associated with a user identification, the methods can include causing the client device to display event cards of the set of event cards in the event feed. In response to a first user selecting the option to reply to the comment from an event card of the displayed event cards, the event card associated with a particular issue, the methods can include causing the mobile device to launch an issue tracking application for the issue tracking service, and causing the mobile device to display issue information and event information for the particular issue in the issue tracking application.

Embodiments are also directed to methods for generating automated responses to event feed items in a multiplatform collaboration system. The methods can include receiving a set of event communications, where each event communication corresponds to an event generated at a respective application service of a set of applications services, and each event communication includes content information for a content item associated with the event and event information indicating a change to the corresponding content item. The methods can include rendering a set of event cards, where each event card corresponds to a content item generated at the respective application service and each event card includes content information and event information. The rendering can include identifying a subset of event cards of the set of event cards, where the subset of event cards corresponds to events that include a comment entered in a comment field of the corresponding content item, and generating, for each event card in the subset of event cards, a reply field comprising the comment and an option to reply to the comment. In response to receiving a request to view an event feed from a client device associated with a user identification, the methods can include causing the client device to display event cards of the set of event cards associated with the user identification in the event feed. In response to a first user selecting the option to reply to the comment from an event card of the displayed event cards, the event card associated with a particular content item, the methods can include identifying the respective application service associated with the particular content item, causing the mobile device to launch an application platform associated with the application service, causing the mobile device to display content information and event information for the particular content item in the application platform, and causing the application platform to generate a response interface comprising a response comment, the response comment prepopulated with a response address for a second user associated with the particular content item.

Embodiments are further directed to methods for generating automated responses to an issue event displayed on a feed card of a multiplatform event feed. The methods can include receiving a set of event communications, where each event communication corresponds to an event generated at an issue tracking service, and each event communication includes issue information for an issue associated with the event and event information comprising a change to the corresponding issue. The methods can include rendering a set of event cards, where each event card corresponds to an issue item generated at the issue tracking service, and each event card includes issue information and event information. The rendering can include identifying a subset of event cards of the set of event cards, where the subset of event cards corresponds to events that include a comment entered in a comment field of the corresponding issue, and generating, for each event card in the subset of event cards, a reply field including the comment and an option to reply to the comment. In response to receiving a request to view an event feed from a client device associated with a user identification, the methods can include causing the client device to display event cards of the set of event cards in the event feed. In response to a first user selecting the option to reply to the comment from an event card of the displayed event cards, where the event card associated with a particular issue, the methods can include causing the mobile device to display the comment field for the particular issue in an issue tracking application for the issue tracking service.

BRIEF DESCRIPTION OF THE DRAWINGS

The disclosure will be readily understood by the following detailed description in conjunction with the accompanying drawings, wherein like reference numerals designate like structural elements, and in which.

Figure 1:
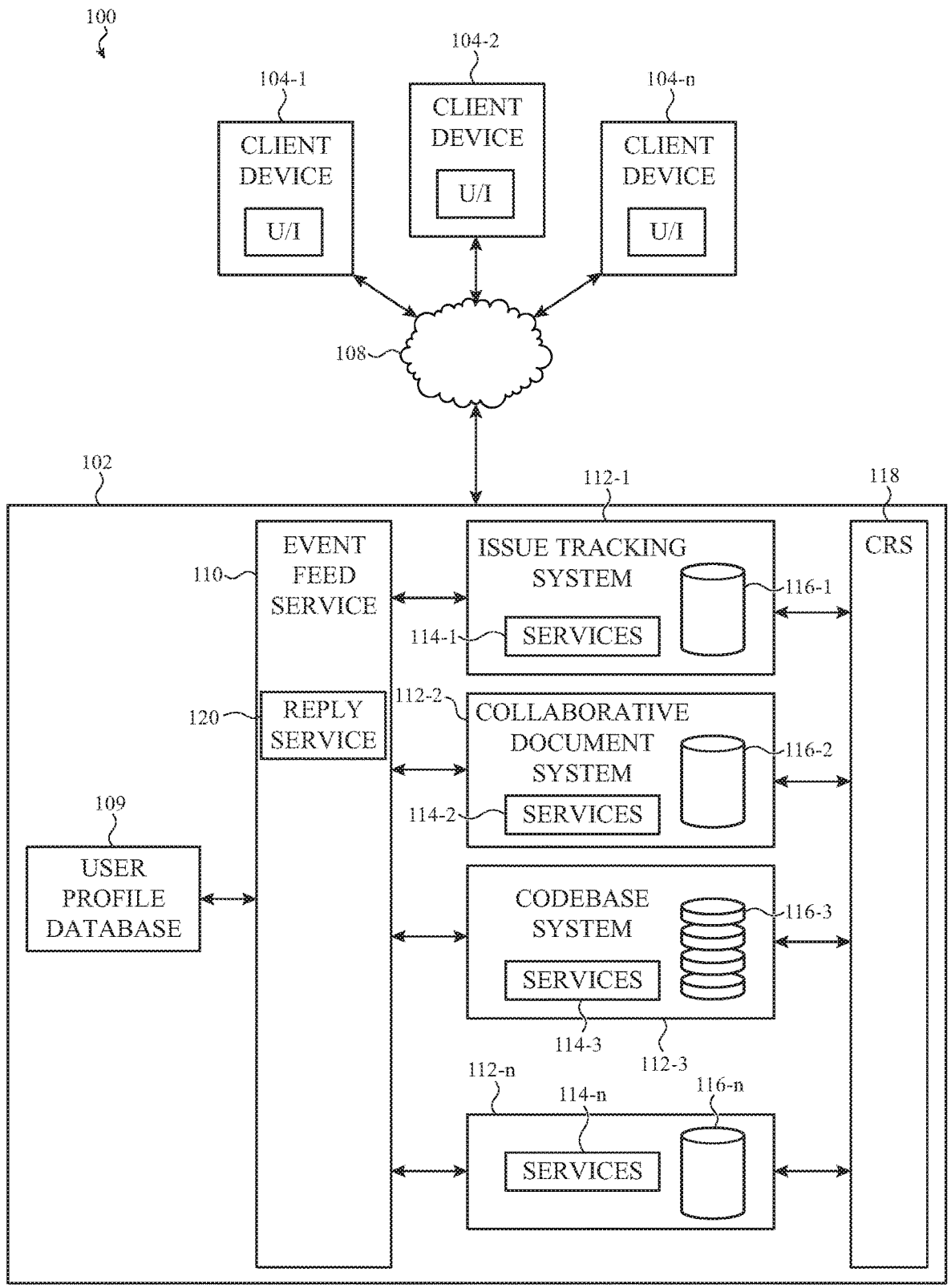
FIG. 1 shows an example networked computer system in which various features of the present disclosure may be implemented.

While the invention as claimed is amenable to various modifications and alternative forms, specific embodiments are shown by way of example in the drawings and are described in detail. It should be understood that the drawings and detailed description are not intended to limit the invention to the particular form disclosed. The intention is to cover all modifications, equivalents, and alternatives falling within the scope of the present invention as defined by the appended claims.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to systems and methods for generating automated responses to event feed items in an issue tracking system and multi-platform collaboration environments. In general, an event feed may display feed items corresponding to content items that are managed in multiple different application environments. An event feed may include feed items that correspond to content managed by a collaborative document service, issues managed by an issue tracking service, or other application services. The feed items may include details about a corresponding content item, indicate events/updates associated with a content item, or provide other information related to a content item. If a user is engaging with a graphical user interface (GUI) of a mobile application, the event feed may show a list or set of graphical summaries for the feed items associated with a user of the device. As used herein graphical summaries relating to a content item may be referred to as a "card," a "feed card," a "feed item," a "tile," or other similar graphical element.

Feed item sources include documents, content items, users, data structures, logical entities (e.g., teams, projects, issues), or other constructs about which feed items may be generated. Feed items may relate to or provide information about events that occur with respect to documents, content items, users, data structures, logical entities, or other constructs. Thus, for example, when a user subscribes to (e.g., follows) a feed item source that is a document, feed items associated with the document may be, for example, notifications about edits made to the document. As another example, when a user subscribes to a feed item source that is an issue managed by an issue management system, feed items associated with the issue may be, for example, notifications of changes to a status or state of the issue. As another example, when a user subscribes to a feed item source that is another user, feed items associated with the user may be, for example, notifications of activities of the other user (e.g., notification when the other user comments on or edits an issue or document). Feed item sources may also be referred to herein as feed sources.

The system may include dedicated application platforms (also referred to as "client applications") for each application service. For example, the system may include a mobile application platform for an issue management system, a mobile application platform for a collaborative document system, a mobile application platform for a codebase system and/or application platforms for other services. Each application platform may have a different GUI scheme and/or set of tools for generating, modifying, or otherwise interacting with content items hosted by a respective application platform. For example, an issue tracking application may provide a GUI scheme and tools for viewing, generating, and/or modifying issues managed by an issue tracking service. In some cases, the mobile application for an issue tracking system may have different GUI schemes and/or tools than a desktop application. As another example, a collaboration document application may provide a GUI scheme and tools for viewing, organizing, generating, or otherwise interacting with documents managed by a collaborative document service. The event feed may generate feed items in response to events occurring at each of the different application services. Accordingly, the event feed may include feed items corresponding to a variety of different application services.

A client application may be a dedicated application that is designed for use with a corresponding backend application. For example, an issue tracking service may include a backend system that tracks and manages issues and one or more client applications that interface with the backend system and provide user interaction schemes and/or UIs on different types of client devices. For example, a dedicated client application can include a mobile application that is configured to run a particular mobile software system. In other cases, a dedicated client application can include a desktop application that is configured to run on a particular desktop software system. Alternatively, the client application may be implemented using a mobile web browser or general web browser that is configured to communicate with and provide an interface for the backend application via web-based protocols such as JavaScript or other suitable web protocols.

Generally, the systems described and referenced herein may generate a content item for each item that is entered into the system. For example, an issue tracking service may generate a ticket or issue number which can be used to track an issue as it is worked on by one or more users of the system. As another example, a collaborative document service may generate and manage documents according to a hierarchical structure and/or user permissions associated with documents and/or groups of documents. The system may generate events, which are aggregated and displayed in an event feed that can be adapted for each user of the system. An event feed for a project manager may show a set of cards for content items that are being managed by the project manager. An event feed for a developer or other user may show a different set of cards for content items that are associated with that user. Accordingly, each event feed may be unique to a particular user. Events for various content items that are associated with a user can be tracked and updated on a continuous basis.

The systems described herein may identify specific types of events and perform a specific action in response to an identified event. For example, if a user comments on a content item, the system may generate an event for the new comment and send an event communication (which may also be referred to as an "event notification") to the feed service. In response to receiving the event communication for the new comment, the feed service may create an event card for the content item that includes a tool for generating a response to the comment. Accordingly, the user may be able to view the card in their event feed, see that a new comment was made in the associated content item, and select an option to respond to the comment all from their event feed. Generating an event item that includes an indication of a comment and an option for replying to the comment may increase user interactions, for example, on mobile platforms where the limited screen size and/or tools typically reduce the amount of information a user can see. For example, in a typical notification feed, a user may be required to open a particular notification item to see the content details and then scroll down to a comments section to open a response tool. These extra steps may decrease responses and/or interactions with user comments.

In some cases, the systems herein may, in response to a user selecting an option to respond to a comment from an event feed, open an application interface corresponding to an application service associated with the content item. For example, if the content item is an issue managed by an issue tracking system, and a user selects an option, from the feed card, to respond to a comment associated with the issue, the system may automatically launch a mobile issue tracking application and generate a prepopulated response to the comment. Accordingly, selecting the option to respond to the comment may take the user out of the issue feed GUI and to a dedicated GUI for the corresponding application service. In some cases, the mobile application service may include additional details about the content item, provide additional context regarding the comment or other items associated with the content item, and so on.

In some cases, generating a prepopulated response to the comment can include opening a comment interface that addresses the response to the creator of the comment. Accordingly, the response may automatically be sent to the creator of the comment in response to completion of the response text. In some cases, the system may identify other user that are associated with the content item and/or the comment and automatically include them in a response or suggest that they be included in the response. In some cases, after sending a response to the comment, the system may cause the mobile device to display the event feed, which may remove the user from the dedicated application service GUI and back to their general event feed GUI. Accordingly, a user may be able to seamlessly transition in and out of different application platforms as they address different types of content items displayed in their content feed. For example, a content feed may display multiple cards corresponding to different issues, multiple cards corresponding to different collaborative documents, and/or multiple cards corresponding to code base projects. As a user selects an option to respond to various ones of these content items from their content feed, the system may temporarily cause the mobile device to open the corresponding application platform to allow them to perform an action in response to the event (e.g., comment) and then cause the mobile application to display the event feed once the user has responded or performed some other action.

These and other features of an event feed service are described herein. While certain example application environments are used to illustrate the features of the event feed service, these are provided for example purposes only. Indeed, the event feed services described herein may generate feed items for, recommend feed item sources from, and display event feeds in numerous different types of software applications and/or services, including but not limited to messaging applications (e.g., instant message applications, email applications, group-messaging applications, etc.), wiki applications, sales management applications, project management applications, source code control applications (e.g., for managing, creating, and/or editing source code for computer programs, websites, etc.), human resources applications, or the like.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 shows an example networked computer system 100 (also referred to as "system 100") in which various features of the present disclosure may be implemented. The system 100 includes an application platform 102 and client devices 104 (104-1, . . . , 104-*n*) that communicate via a network 108 (e.g., the Internet). The client devices 104 may be any suitable type of device, including but not limited to a desktop or laptop computer, tablet computer, mobile phone, personal digital assistant, smart device, voice-based digital assistant, or the like.

The application platform 102 may be or may include one or more servers, content stores (e.g., databases), communications systems, data structures, programs, or other components, systems, or subsystems that provide services described herein, including event feed services. The application platform 102 may include an event feed service 110, one or more software applications 112 (e.g., 112-1, . . . , 112*n*), a user profile database 109, and a content update service 118. The one or more software applications 112 provide content and content services to users of the system 100, as described herein. The event feed service 110 may generate event feeds, and may send and receive information relating to the event feeds among the software applications 112 and client devices 104 of the system 100.

The software applications 112 may include application services 114 (e.g., 114-1, . . . , 114-n) and data stores 116 (e.g., 116-1, . . . , 116-n). Application services 114 may facilitate the creation, deletion, management, editing, serving, and/or other services related to the issues, content, and/or content items associated with that software application and stored in the data store 116. The application services 114 may also generate events or messages in response to changes or activity occurring with respect to the various software applications 112. Data stores 116 may be databases or other data storage resources that store content items and/or other data related to a software application 112. The software applications 112 may be associated with dedicated servers or server systems. The software applications 112 may also be implemented using a software as a service (SaaS) architecture which may be accessed by a client device 104 via a web browser or other similar client application.

In some cases, a first software application 112-1 may be an issue tracking system that tracks issues or discrete aspects of a development project or other process using tickets or an issue number. Information related to the various issues (referred to herein as "issue data") may be stored in a respective data store 116-1. In general, issues are tracked along a workflow or set of issue states from initiation to resolution. Issue data may include various content including, for example, a user-generated description of an issue, issue status (e.g., closed, open, awaiting review), assignee, supervisor or reviewer, related user, issue urgency, issue age or pendency, images, links to code, and other issue-related content. Each issue and, in some cases each state, may be associated with a different assignee or user responsible for completing the issue or state. In some cases, issue data may include user-generated specifications of issues in computer code of software products. Issue data may be stored in the data store 116-1 as files, data structures, or the like.

Issues managed by the issue tracking service may be associated with a project, various users and/or one or more teams or groups of users. For example, a project may include a set of issues and the issues may be organized based on a workflow and/or dependency of issues on each other. Accordingly, some issues may need to be addressed before other issues can be completed (or started). In some cases, issues may have one or more states (e.g., active, pending, not started, complete, and so on) and can be changed from a first state (e.g., pending) to a second state (e.g., active). In some case, one or more users can change a state of an issue, which may cause an event communication to be sent to the event feed service. Accordingly, as issues states are changed, the event feed service may update feed items to reflect these changes.

The application services 114-1 of the issue tracking system may facilitate content services related to the issues, including causing user interfaces of the issue tracking system to be displayed to a user on a client device 104, receiving user inputs relating to the creation and/or modification of issues (e.g., changing status, receiving content related to the issue and/or issue resolution, etc.), changes to issue status, changes to user assignments, and the like. The application services 114-1 may also send to the event feed service 110 event notifications or other communications related to events (which also may be referred to as "event communications") caused by activity related to the various issues being tracked by the issue tracking system 112-1.

A second software application 112-2 may be a collaborative document system. The collaborative document system may allow users (e.g., via client devices 104) to create, modify, view, and/or otherwise interact with documents, which may be stored in the data store 116-2. Documents may be user-generated, and may include content such as text, images, graphics, tables, or the like. Documents may be linked or otherwise related to one another in a document hierarchy. Documents (e.g., user-generated documents) may be stored in the data store 116-2 as files, data structures, or the like.

The application services 114-2 of the collaborative document system may facilitate content services related to the documents, including causing user interfaces of the collaborative document system to be displayed to a user on a client device 104, receiving user inputs relating to the creation and/or modification of documents, and the like. The application services 114-2 may also send to the event feed service 110 notifications, messages, or other communications regarding events generated in response to activity related to user-generated documents stored in the data store 116-2 or otherwise managed by the collaborative document system 112-2.

A third software application 112-3 may be a codebase system that provides services related to creating, developing, maintaining, and/or deploying software code. Software code may be stored in codebases 116-3. In some cases, code for distinct software programs, environments, platforms, or the like, may be stored in or as distinct codebases 116-3. Distinct codebases may be stored in different databases or data stores, or they may share one or more databases or data stores. Similar to the other systems described above, the codebase system may transmit messages or notifications regarding events (commits, pulls, deployments, etc.) that reflect activity managed by the codebase system 112-3.

The software applications 112 may communicate with a content update service (CUS) 118. The content update service 118 may monitor, track, analyze, and/or store information about relationships between and among content items and users of the application platform 102. For example, the CUS 118 may monitor for and/or maintain information about which users have accessed, created, modified, commented on, viewed, or otherwise interacted with which content items in the application platform 102. Further, the CUS 118 may monitor for and/or maintain information about links between content items in the application platform 102. The CUS 118 may analyze the information to determine links between content items, user generated documents, users, teams, projects, issues, issue tickets, codebases, and/or other entities of the application platform 102. The CUS 118 may monitor information in real time (e.g., in direct response to and shortly following the actions generating the information) or may obtain information from user event logs, transaction logs, or other similar data stores created in response to user interactions with the software applications. While the event feed service 110 and the CUS 118 are depicted as two separate services, they may be combined as a single service performed on shared hardware and/or by the same composite services.

The event feed service 110 communicates with the software applications 112 and/or CUS 118 to receive notifications of events (and optionally content associated with the events). The notifications of events may be provided to the event feed service 110 according to a push protocol in which the software applications 112 send the notifications according to their own schedule (e.g., in response to an event occurring and generating a notification), or according to a fetch or pull protocol in which the event feed service 110 requests or pulls notifications of events from the software applications 112.

The event feed service 110 may generate event feed items (or simply feed items) and event feeds for users based on the received notifications, and send and/or provide the event feeds to client devices 104 for display to users. For example, the event feed service 110 may receive a notification of a modification to an issue in an issue tracking service (e.g., the software application 112-1), and generate a feed item based on the notification. The feed item may include information about an issue and one or more actionable input objects that a user can interact with to cause a change or modification to the issue. The feed item may be displayed to a user (e.g., on a client device 104) in a manner that is customized based on factors such as the identity of the user, the software application in which the event feed is displayed, feed presentation preferences of the user, or the like. The event feed service 110 may generate feed items and send the feed items to the client devices 104 for display in an event feed. In some cases, the event feed service 110 generates definitions of feed items, where the definitions include an address of the underlying content item to which the feed item relates. The definition, when sent to a client device 104, may cause the client device 104 to retrieve the content item or information from the content item. In some case, an event feed may also be referred to as a "board" or "event board."

The event feed service 110 may store and manage subscriptions of users to feed item sources. For example, for each user for which the event feed service 110 generates event feeds, the event feed service 110 may maintain a list of feed item sources to which that user subscribes (e.g., follows). When events occur with respect to those feed item sources (e.g., when notifications are received from or associated with a feed item source), the event feed service 110 may generate feed items based on those notifications, and include those feed items in the event feeds of users who have subscribed to the feed item source.

The event feed service 110 may track and update feed item over time and/or as updates or changes are made to the corresponding content item. Accordingly, in some cases, the event feeds described herein may be used in the context of project management activities that are used to coordinate multiple different users and/or teams working on a variety of projects. For this reason the event feeds described herein may be updated and display feed items based on criteria that are related to development of a content item. The event feeds described herein may be more persistent than a typical social media feed, which is primarily time based. For example, as feed items are updated, priorities of feed items changed, deadlines approach or other changes are made, the event feed service may cause these feed items to be displayed in different orders, with different urgencies and or in other ways, for example, that facilitates more urgent issues being shown higher in a feed. Accordingly, the event feeds described herein may be dynamic and how the event feed items are displayed (e.g., order in a feed) and/or information displayed in the event feed items may be continually changes and updates are made to the underlying content items.

As used herein, a user subscribing to or following a feed item source may result in the user receiving feed items in their event feed related to the feed item source. Subscriptions may be stored and/or managed by the event feed service 110 as described herein. Subscribing to or following a feed item may result in all events associated with the feed item source being included in an event feed to the subscribed user, or only a subset of the events associated with the feed item source. A subscription to content such as a document may result in events that occur with respect to that content (e.g., edits, comments, changes in status, etc.) being included in the event feed of a subscribed user. A subscription to a user may result in events that occur with respect to the user being included in the event feed of a subscribed user. More particularly, any activity or action of or associated with a user with respect to content or other entities in the networked computer system 100 may be the subject of a feed item in a subscribed user's event feed. For example, a first user may have many different interactions with content in a networked computer system 100. When a second user subscribes to a first user, the activities of the first user in the networked computer system 100 may initiate feed items in the event feed of the second user, even across multiple content items, types of content, etc. Thus, for example, if the first user comments on a document, changes a status of an issue ticket, or becomes a member of a project or team, each of those events may cause a corresponding feed item to be generated and displayed to the second user.

The event feed service 110 may also receive, from client devices 104, information about interactions with the feed items. For example, if a user interacts with an actionable input object of a feed item, information about that interaction may be sent from a client device 104 to the event feed service 110, which may then communicate that information to the relevant software application 112. As one nonlimiting example, if a user interacts with a feed item relating to an issue ticket and assigns the issue ticket to another user, the event feed service 110 may receive the information (e.g., an identifier of the issue ticket and an identifier of the new user), and provide that information to the event feed service 110 so that the underlying content item (e.g., the issue ticket) can be modified appropriately. In some cases, the event feed service 110 communicates interactions to the CUS 118, which may be recorded as part of the activity feed for any related content (issues, documents, code, etc.).

The application platform 102 may include a reply service 120, which may be implemented as part of the event feed service or separate from the event feed service. The reply service 120 may be configured to manage comments that are associated with a content item hosted by one or more of the software applications 112. The reply service 120 may identify when an event such as a comment is generated in a content item and cause the event feed service 110 to render a card indicating a new comment or other type of event. The reply service 120 may track a comment history associated with a content item and/or users associated with the various comments and/or a corresponding content item. In some cases, the reply service 120 can cause a client device 104 to display an option for responding to a new event such as a new comment that is provided to a content item. The reply service 120 may auto-populate and/or suggest one or more aspects of a response message. For example, the reply service 120 may identify a user that posted a comment, and cause a response message to be generated that includes a reference to the user.

The reply service 120, may interface with the CUS 118 and the software application 112 and be configured to cause a client device 104 to launch an application service associated with a particular software application 112. For example, if a first user generates a comment to in an issue managed by the issue tracking system 112-1, in response to a second user selecting an option in the event feed to respond to the comment, the reply service 120 may cause the client device 104 to open the issue in an issue tracking application.

While collaborative document systems, issue tracking systems, and codebase systems are used as example software applications, these are merely examples of software applications that may be used with event feed services described herein. Other types of software applications and/or content sources that may provide feed items and about which feed item source recommendations may be generated include, without limitation, messaging applications (e.g., instant message applications, email applications, group-messaging applications, etc.), wiki applications, sales management applications, project management applications, human resources applications, or the like.

Figure 2A:
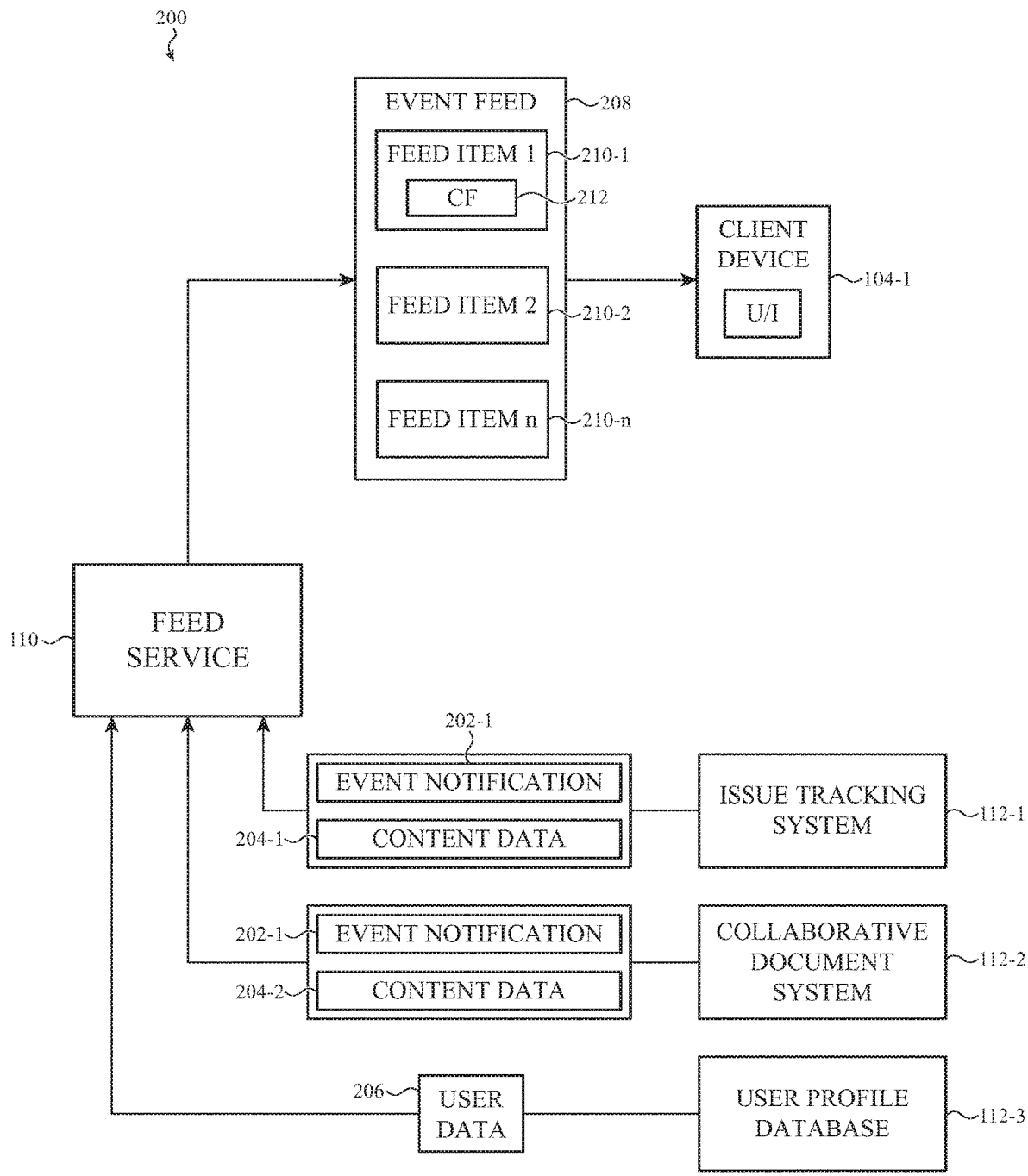
FIG. 2A shows an example operation of how an event feed service generates event feeds for users for event sources generated by multiple application platforms and also generates a reply option within the context of an event feed.

FIG. 2A illustrates how the event feed service 110 generates event feeds for users for event sources across multiple application platforms and also generates a reply option within the context of an event feed.

Multiple content sources, such as software applications 112, may send notifications of events (event notifications 202) associated with the content sources to the event feed service 110. The event notifications 202 (also referred to as "notifications 202) may be triggered by an event occurring with respect to a content item associated with the software application or other content source. For example, a change in a status of an issue ticket may cause an event notification 202-1 to be sent to the event feed service 110 from an issue tracking system. Other examples of events that trigger an event notification 202 include, without limitation, an edit to the content of a user-generated document, a request for an approval in respect of a content item, an upcoming deadline or due date for an action or content item, or the like.

The event feed service 110 may also receive or access data from the content sources, the user profile database 109, and/or the CUS 118. For example, the event feed service 110 may receive or access content data 204 from the content sources, user data 206 from the user profile database 109, and user and content relationship data from the CUS 118. The event feed service 110 may use the data to determine and/or identify feed item sources that are relevant to a user. Relevancy to a user may be determined based on the received data, and more particularly, on associations between the user and other entities in the application platform 102 (e.g., users, projects, documents, issue tickets, issues, etc.) that are represented in the data. The event feed service 110 may analyze the data to identify such associations and thereby identify feed item sources that may be relevant to the user.

In some cases, the feed service 110 can generate different types of feeds that may contain and/or be populated with feed items based on specific criteria. In some cases, types of feeds may be referred to as a "board," or an "event board." For example a board may be generated based on a specific project. In this example, the board may only display feed items that are associated with the specific project, which may allow a user to organize the feed items on a project-by-project basis. Accordingly, some feed items may show up on multiple different boards and/or event feeds based on whether the feed item meets a criteria for each of the different feed and/or boards. Boards can have a variety of different criteria for displaying feed items, such as project based, team and/or user based, timing and/or deadline based, based on when updates occurred to a content item and so on.

Content data 204 may be or may include data about content items associated with the content sources. Content data 204 may include, without limitation, names of content items, identifiers of individuals who are associated with content items (e.g., users who have created, modified, viewed, commented on, been assigned to, or otherwise interacted with content items), subjects with which content items are associated (e.g., projects, teams, codebases, issues, etc.), and the like.

The event feed service 110 may use the user data 206, content data 204, and/or user and content relationship data to generate feed items 208. Feed items 210 may be displayed in an event feed, and may be similar in appearance (e.g., size, shape, position, etc.) to other feed items in an event feed 208. The graphical representation of feed items may be referred to as cards, event cards, tiles and so on. Feed items 210 include one or multiple cards and representing feed item sources that a user can choose to follow. The cards may each provide information about the feed item sources and one or more selectable elements that a user can select in to perform an action. The information in the cards may include, without limitation, a name and/or image (e.g., photograph or representative icon) of the feed item source.

In some cases, a feed item can be displayed without an underlying event and/or update to the corresponding content item. For example, a user may subscribe to specific content items such as an issue, collaborative document and so, and the system may generate and display feed items corresponding to these content items regardless of receiving an event notification. Additionally or alternatively, a user or team member may designate a content item with a status that causes the feed item to be displayed for the user and/or members of the team even if there is no recent activity.

The event feed service 110, may use the content data 204 and/or the user data 206 to identify events that include a comment associated with the corresponding content item. In response to determining that an event notification 202 comprises a comment, the feed service 110 may generate feed items 210 that include a comment field (CF) 212. For example, a first feed item 210-1 may include a comment field (CF) 212 that is displayed within the card. The comment field 212 may display a comment associated with the content item, a user associated with the comment and/or other information relevant to the comment. In some cases, the comment field 212 can include an option to respond to the comment, which may trigger an automated response process, for example as described with reference to FIG. 4B. A comment field 212 may only be displayed in response to determining that an event notification 202 includes a comment. Accordingly, in some cases, not all feed items 212 may include the comment field 212.

The feed service 110 may keep track of which feed items 210 correspond to which events notifications 202 and/or a corresponding content item at an application service. For example, the feed service 110 may generate a registry that associates event notifications 202 and/or content data 204 with a corresponding feed item 210. Accordingly, as a user interacts with various feed items 210, the feed service 110 can identify the corresponding content item managed by one of the application platforms 112.

Returning to the operations for generating event feeds, the notifications 202 may include information about the event, such as a textual description of the event, a code indicating the event, or the like. The notifications 202 may also include information related to the content item associated with the event. For example, information related to the content item may include an identifier of the content item (e.g., an address, a URL, a unique identifier of the content item in the content source, a file name, etc.), content from the content item (e.g., a portion of textual, graphical, or other content from the content item), metadata or attributes associated with the content item (e.g., an author of the content item, a title of the content item, a type or category of the content item), user inputs associated with the content item (e.g., user inputs that may be included as actionable input objects in event feed items), or the like. In some cases, an event notification 202 may include a complete specification of a feed item associated with an event.

The notifications 202 may also include information that may be used to prioritize or rank feed items in a user's feed. For example, notifications 202 may include a date on which an action item is due or is requested to be completed. A feed item corresponding to that notification may be ranked and/or prioritized in a user's event feed based on that date. For example, if the date is not imminent, the feed item may be positioned lower in the event feed. If the date is imminent, the feed item may be positioned higher in the event feed. In some cases, if a due date or requested-by date is imminent, it may re-appear in the event feed so that the user encounters the feed item multiple times as they scroll through their event feed (or as the event feed otherwise advances or displays new feed items). The imminency of a due date or requested-by date may be based in part on a timeline or duration associated with the task. For example, the task is one that is generally accomplished quickly (e.g., approving a closure of an issue ticket, assigning an issue ticket to a user), a feed item associated with that task may be considered imminent when the due date or request-by date is within one day (or less, such as within 6 hours). If the task is one that generally takes a longer time to complete (e.g., reviewing user generated content or edits to a document, reviewing changes to a codebase), the feed item associated with that task may be considered imminent when the due date or request-by date is within one week (or any other suitable timeline). The event feed service 110 may store data regarding the estimated time to complete certain tasks that may be the subject of feed items, and may use the estimated times along with the date information included in a notification 202 to determine how to rank and/or display feed items in an event feed.

Once a due date or request-by date has passed, the feed item for that content item may be persistently displayed in the user's event feed, such as at the top of the list in the feed. In some cases, past-due feed items cannot be scrolled off of the feed or otherwise removed from display until they are completed. As another example, past-due feed items may be muted or snoozed for a period of time, but they may continue to be displayed to the user at intervals until they are completed.

A notification 202 may also include an urgency indicator. An urgency indicator may be user-selectable, or may be selected based on a type of event that triggered the notification. Urgency indicators may indicate a relative urgency of a task or notification, without necessarily including a due date or requested-by date. Urgency indicators may include a limited set of options. For example, the urgency of an event may be selected from high urgency, normal urgency, or low urgency. As another example, urgency may be scaled from 1-10 (with 10 corresponding to the highest urgency). The event feed service 110 may use the urgency indicator to determine how, where, and/or how frequently the associated feed item is displayed to the user. For example, high urgency feed items may be shown to a user more frequently or may be shown higher in the feed order than normal or low urgency items. In some cases, the urgency of a feed item may be determined by the event feed service 110 (e.g., without a user-specified urgency) based on factors such as the software application to which the feed item relates, whether the feed item includes an actionable input object or otherwise requires or prompts the user to take some action, an urgency of a project or task to which a feed item relates, or the like.

Notifications 202 may be provided from multiple content sources, such as software applications 112, where the content sources may be associated with different types of content and/or different types of content services. As described above, the software applications 112 may be part of the same application platform 102 as the event feed service 110. In such cases, the software applications 112 and the event feed service 110 may both be capable of accessing the same content items. Accordingly, the notifications 202 may include references to content items in place of actual content from the content items. This may reduce the size and complexity of the notifications 202 and may result in greater efficiencies in the application platform 102. The notifications 202 may be formulated as application programming interface (API) calls.

The event feed service 110 receives the event notifications 202 from content sources (e.g., software applications 112) and the API calls from third-party sources and generates feed items based on the notifications. The feed items may be generated based on the information in the event notifications 202 and the API calls, as well as content retrieved from other sources. For example, the event feed service 110 may receive a notification 202 that includes a reference to a content item (e.g., an address or file name), and the event feed service 110 may communicate with a data store (e.g., a data store 116) to retrieve the content item or information from the content item for inclusion into a feed item.

Upon request from a client device 104-1 (e.g., from an application executed on the client device 104-1), the event feed service 110 may generate an event feed and provide the event feed to the client device 104-1. The event feed may be generated specifically for the user associated with the client device 104. For example, the event feed may include feed items that are relevant to the user. Relevancy to a user may be based on various factors, such as whether the user is explicitly identified in the feed item, whether the feed item relates to a content item for which the user is an author or contributor, whether the feed item relates to an organizational role of the user, whether the user has interacted with similar feed items in the past, whether the user's input is required by the content item, or the like.

Figure 3A:
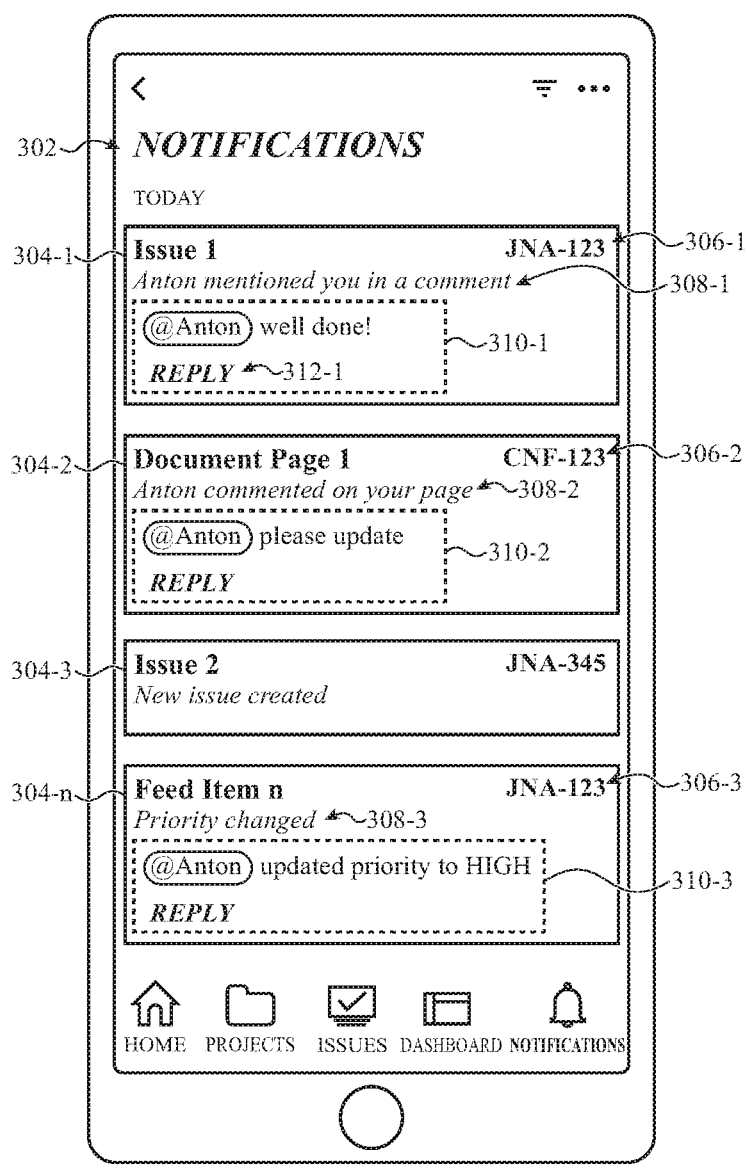
FIG. 3A shows an example of an event feed in a graphical user interface of a mobile application.

As described above, event feeds 208 may be displayed to users in various different software applications. More particularly, event feeds 208 may be user-specific, rather than application-specific, and as such, a user's event feed may be displayed to the user in the graphical user interfaces of multiple different software applications. In some cases, a user's event feed 208 may have a different appearance or different feed settings based on the particular software application in which the event feed is being displayed. FIG. 3A illustrates an example event feed 208 for a user.

Figure 2B:
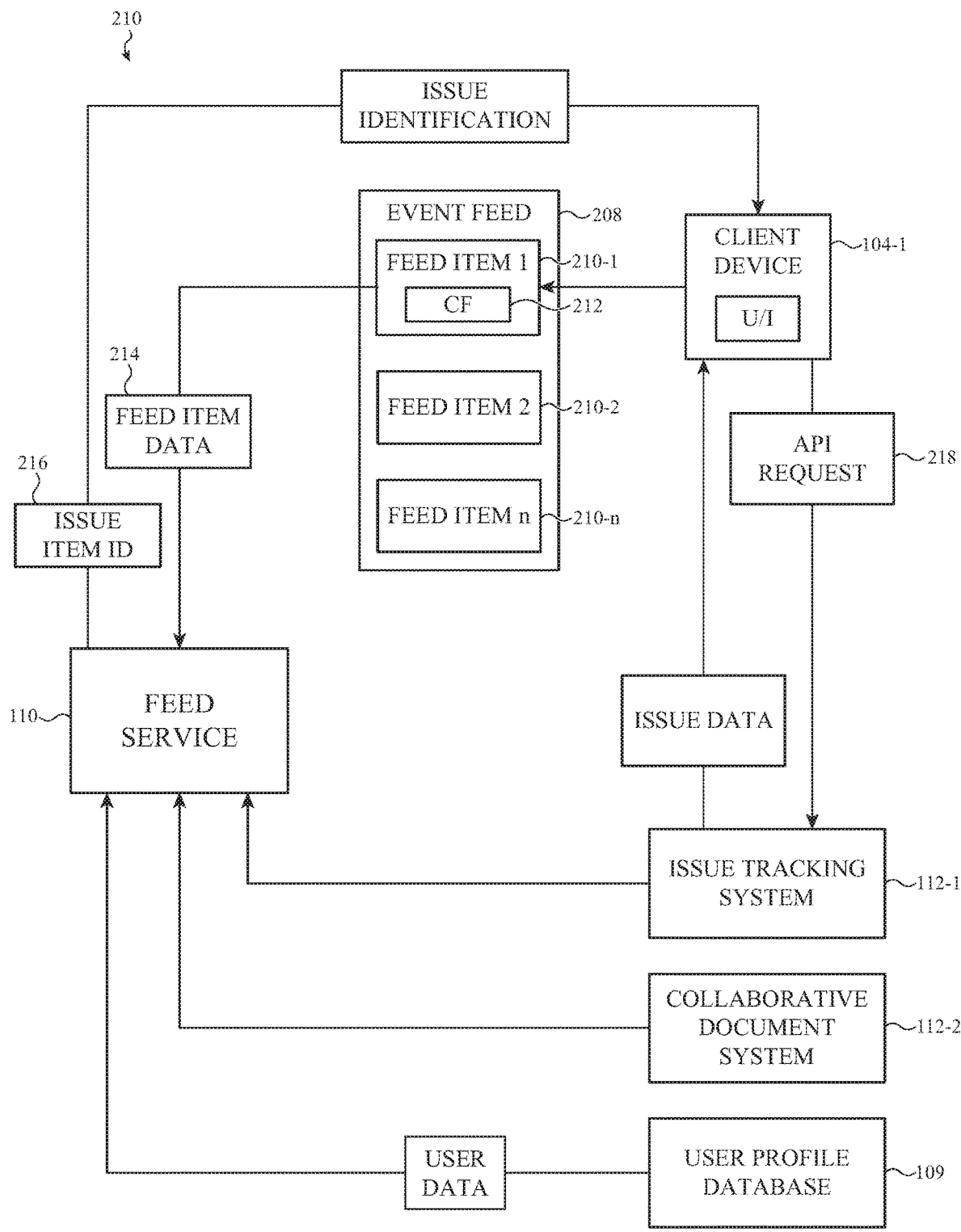
FIG. 2B shows an example operation of an event feed service that manages automated responses from an event feed interface.

FIG. 2B illustrates how the event feed service 110 generates a reply to a comment within the context of an event feed and opens the comment within the context of the software application.

In some cases, a user may interact with the client device 104-1 to select an option to reply to a comment, which may be displayed in the comment field 212 of a feed item 210, for example, the first feed item 210-1. In response to selecting the option to reply to a comment the client device may cause feed item data 214 to be sent to the feed service 110. The feed item data 214 can include information about the feed item 210-1 corresponding to the comment. For example, the feed service 110 may generate a unique identification for each feed item 210 (referred to herein as a feed item ID) and associate each of the feed item IDs with a particular application platform 112 and a particular content item managed by the application platform. In some cases, the feed service 110 may receive a content item ID for each event from a corresponding feed platform 112. The content item ID may uniquely identify a content and a specific event associated with the content item. Accordingly the feed service 110 may include a database, registry or other data structure that correlates a content item IDs to feed item ID and/or a specific notification of a feed item such as a comment field 212.

In response to receiving the feed item data 214, the feed service 110 can identify the corresponding application platform 112, a content item managed by the application platform 112 and an event associated with the content item. In the example illustrated, the first feed item 210-1 may have been generated in response to a comment to an issue managed by the issue tracking system 112-1. The comment can cause the event notification (including an issue item ID) to be sent to the feed service 110, and in response, the feed service 110 may generate the first feed item 210-1 and a first feed item ID associated with the first feed item. Accordingly, in response to receiving feed data 214 including the first feed item ID, the feed service 110 can identify that that the first feed item 210-1 corresponds to the comment at the issue tracking system 112-1.

The feed service 110 can cause the client device to open the corresponding application platform 112. For example, the feed service sends an issue identification 216 to the client device 104-1, which can include the content item ID that corresponds to the comment made to the first issue managed by the issue tracking system. In some cases, this can be a URL or other location identifier of the issue. The feed service 110 can cause the client device 104-1 can use the content ID to identify the application platform 112 (e.g., the issue tracking system 112-1), a corresponding issue and the event that generated the issue. In some cases, the client device can send an API request to the application platform 112, which causes a mobile application/GUI for the application platform 112, the issue tracking system 112-1, to display issue details including the comment that generated the first feed item 210-1. In other cases, the feed service can redirect the client's browser or other UI to the appropriate application platform. Accordingly, in response to the user selecting the response option displayed in the comment field 212 of the first feed item 210-1, a mobile application for the issue tracking system 112-1 (or other application platform) can be opened to allow and display the corresponding event to the user in the context of the issue (or other content item).

In some cases, the API request can cause the issue tracking system 112-1 to generate a response message to the comment. The response message may be automatically populated with one or more fields such as a reference to a user(s), which can include a user that generated the comment and/or users associated with the issue, as described herein.

FIG. 3A shows an example of an event feed 300 in a graphical user interface of a mobile application. The event feed 300 can include feed cards 304 that are selected for a particular user based on one or more criteria. In the illustrated example, the event feed 300 can include a notifications feed 302, which may be configured to display feed cards 304 for new events that are associated with a user. In other cases, other types of feeds 302 can be configured for a user, which may obtain and display feed cards according to other criteria, for example, displaying feed cards for events on a project basis or any other suitable criteria.

The notifications feed 302 may include feed cards 304 for content items managed by different application programs as described herein. For example a first feed card 304-1 can be for an issue managed by an issued tracking system, and a second feed card 304-2 can be for a document page managed by a collaborative document system. In other examples, a particular feed (e.g., notifications feed 302) can be configured to display cards from a particular application platform or group of application platforms.

Each feed card 304 can include information about the corresponding content item including a title, a content item identification 306, summary information 308, and a reply function 310. In some cases, the reply function 310 may only be generated in response to certain events such as a comment, changes to status or other types of events. The system may be configured with specific types of events that generate a reply function.

The first feed card 304-1 may include a title identifying the issue (e.g., Issue 1), an issue identification 306-1, which may be an identification generated by the issue tracking system or the feed service. The issue identification 306-1, may be a type of issue card ID that is used by the event service to uniquely identify the card and correlate the first feed card 304-1 to an application platform (e.g., the issue tracking system), a specific issue at the application platform and an event that generated the first feed card 304-1. The first feed card 304-1 can include a first summary 308-1, which may provide information about the event the generated the card and/or other relevant information about the issue. For example, the summary information 308 can include other a priority of the content item, a time/data the event occurred, other users associated with the event and so on.

The first feed card 304-1 can include a first reply function 310-1, which may be generated in response to specific types of events as described herein. In this example, the event for the first feed card 304-1 may be a comment to the issue. The first reply function 310-1 can include information related to the comment, for example, it can show the comment along with a user who made the comment (e.g., @Anton). The first reply function 310-1 can include an option for responding to the comment 312-1, which may be a selectable user interface element that, when selected, initiates a reply function, as described herein.

The notifications feed 302 may include a second feed card 304-2 corresponding to document page managed by a document management system. The second feed card 304-2 can include a document identification 306-2, which may be used by the feed service and/or collaborative document system to identify the corresponding documents page and/or event that generated the second feed card 304-2. The second feed card 304-2 can include a second summary information 308-2, and a second reply function 310-2, which may initiate a reply process to event for the second feed card 304-2.

In some cases, some types of events may not generate a reply function. For example, when a new issue is created a new event feed card 304-3 may be generated, but the system may not generate a reply function 310 for this type of issue. Events the generate a reply function may be configured in a variety of ways including being defined as system level configurations, be configured by one or more users, or in any other suitable way.

Figure 3B:
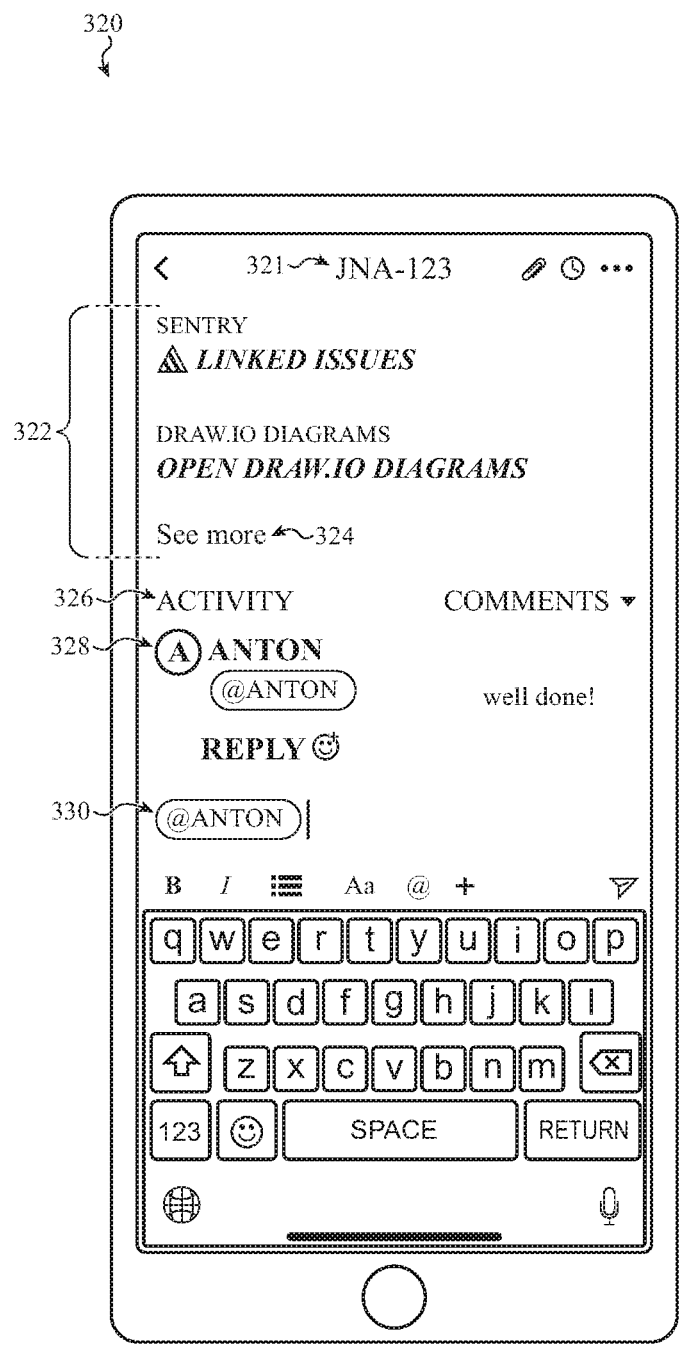
FIG. 3B shows an example of how the event feed service generates a reply to a comment within the context of an event feed and opens the comment within the context of the content item displayed by the respective software application.

FIG. 3B shows an example of an issue details page 320 that was generated in response to a user selecting the option for responding to the commend 312-1. The issue details page 320 may be displayed in a mobile application for an issue tracking system. Accordingly, in response to the user selecting the option for responding to the commend 312-1, the system may cause the mobile device to launch an application platform corresponding to the type of issue, in this example, an issue management application. Accordingly, in some cases, a reply or other action in response to the comment may be entered in the corresponding application platform and not directly in the event feed (e.g., card displayed in the event feed). The issue details page 320 can include an issue identification 321, which may be a serial number, title or other information that is used to identify the issue.

The issue details page 320 can also include issue information 322, which can include details related to the issue such as a priority of an issue, links to other issues, diagrams or other documents for the issue, or any other details. In some cases, selecting the option for responding to the comment 312-1 causes the issue details page to display the event (e.g., comment) associated with the feed card. Accordingly, in this case, the issue details page 320, may display the comments field 326 for the issue and other issue details may not be display. For example, if a user navigated to the issue directly from the issue tracking platform, the issue details page 320 may display a different set of information, which may include a title of the issue, a priority of the issue and so on. However, in response to the user navigating to the issue by selecting the option for responding to the commend 312-1, the system may cause the issue details page to display ("jump") to the portion of the issue associated with eh event. In some cases, the issue details page 320 can include a function 324, which when selected allows the user to view other details related to the issue.

The comments field 326 can include the comment 328 that generated the event and/or may include other comments related to the issue. The comments field 326 may also generated a response interface 330 for responding to the comment. The response interface 330 may be automatically populated with information (e.g., a user address for the reply) based on the user selecting the option for responding to the commend 312-1 from the event feed 300. For example, the response interface may automatically reference the user that generated the comment 328 so that the reply message is sent to that user. In other cases, additional users may be populated and/or suggested based on a variety of factors including the type of event, content of the comment, an association with the issue, and so on as described herein.

In some cases, the reply can be displayed to indicate that it is a reply to a specific comment. For example, a reply to the comment can be displayed below the comment and/or indented from the comment. In some cases, the reply can generate and event and/or other action that notifies the poster of the comment that a user has replied to their comment.

Figure 4:
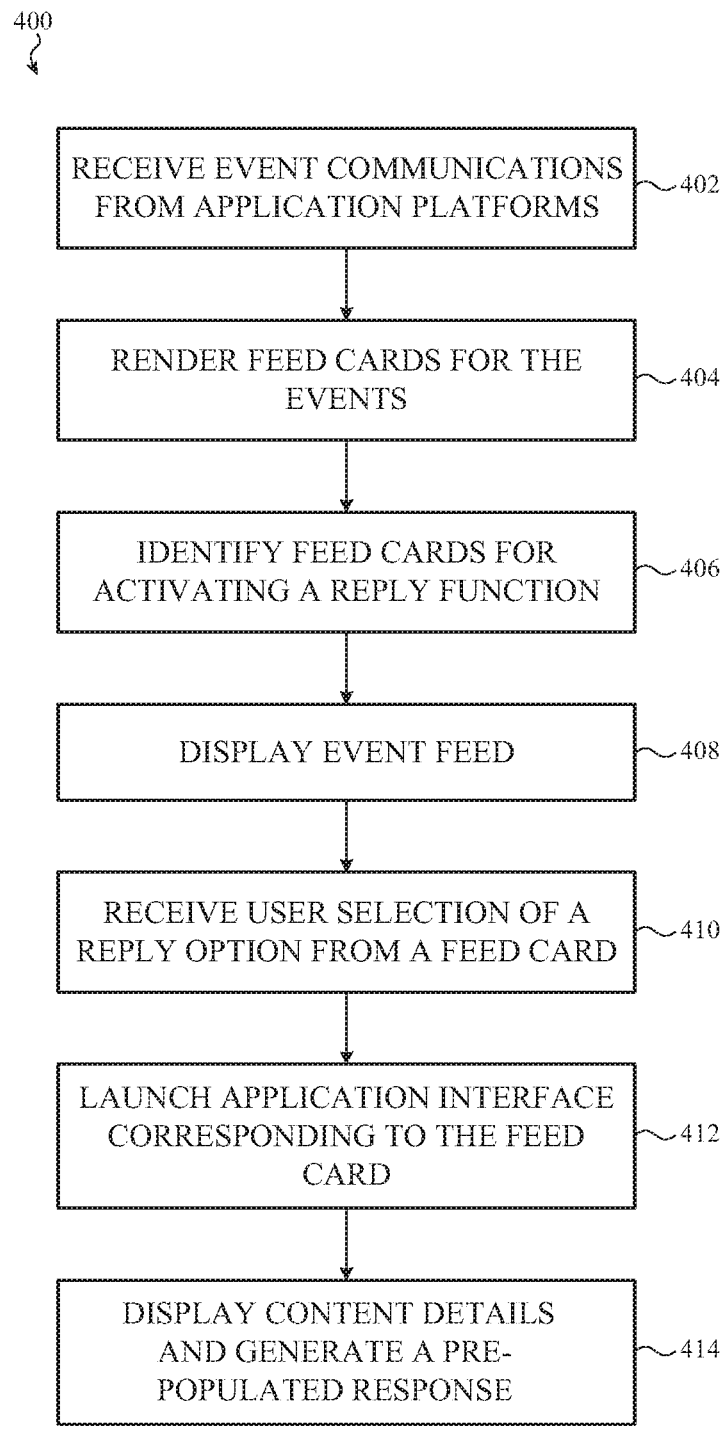
FIG. 4 shows an example process for displaying notifications in an event feed and generating responses on a mobile application for a multi-platform application system.

FIG. 4 shows an example process 400 for displaying notifications in an events feed and generated responses on a mobile application for a multi-platform application system. The process can be performed by the systems described such as the networked computer system 100.

At operation 402, the process 400 can include receiving indications of events from one or more application services, as described herein. In response to a user performing a function at an application service, the application service may generate an event based on the user interaction. The application service may send the event or an event notification of the event to the feed service. Each event notification can include content information for the associated content item and event information indicating a change or action to the associated content item.

In the case of an issue tracking system, an event may include a comment on a particular issue. The issue tracking system may send an event notification of the event to the issue feed service. The event notification of the event may include an event identification, a type of event, an issue identification (e.g., serial number), other issue data such as a priority of the issue, a summary of the issue, and so on. In some cases, the issue can include the comment and/or other comments made to the issue, a user identification of a user who made the comment, or other information about the comment.

At operation 404, the process 400 can include rendering feed cards for event notifications received by the feed service. In response, to the feed service receiving an event notification of an event, the feed service can render a feed card (which also may be referred to as an event card) for the corresponding event. The feed card can include information about the content item associated with the event and/or information about the event. For example, each feed card can display content information such as a title of the content, an identification associated with the content item (e.g., ticket number for an issue, a page id number for a content page, etc.), or other information about the content item, as described herein. Each feed card may also include event information, as described herein, for example in reference to FIG. 3A.

At operation 406, the process 400 can include identifying feed cards for activating a reply function. As described herein, specific types of events may cause one or more functions to be displayed within a feed card. For example, a comment to a content item may cause the event feed service and/or the mobile application to activate a reply function and display the reply function within the corresponding feed card. In some case, the event feed service may determine which events should have a reply function activated.

In response to activating a reply function, the event feed service may generate a comment field that displays the comment and/or other event that caused activation of the reply function, and an option to reply to the comment. The reply field can be displayed with the corresponding feed card. Accordingly, different feed cards may each include a reply field based on the event and that include information associated with the event.

In some cases, the event feed service can associate each event with one or more users and include a reference to a user in the feed card. For example, if a particular user made the comment to the content item for the feed card, the event feed service may associate the event and/or corresponding feed card to that user. In some cases, the replay function can include the comment made by the user and a reference to the user. Accordingly, a user may view a feed card and be able to see the most recent comment (and/or additional comments) and a reference to a user who made the comment.

At operation 408, the process 400 can include causing a mobile device to display an event feed including the feed cards associated with a user of the mobile device. For example, a user may open their event feed thereby generating a request from the mobile device for feed items from the event feed service. In response, the event feed service may send event cards associated with the user in the event feed, as described herein.

At operation 410, the process 400 can include receiving a user selection of a reply option displayed on a feed card. In some cases, the mobile device can include a touch-sensitive display and each event card that include a reply function, may display a UI icon that can be selected by the user (e.g., using a touch input). In other cases, the other methods may be used for selecting a reply option such as a mouse and/or keyboard input, voice commands, or any other suitable processes.

In some case, in response to a selection of the reply function, the system allows a user to respond to the event directly from the event feed interface. For example, the selection of the reply button may generate a reply messaging interface in the event feed and a user may be able to generate a reply directly from the event feed/feed item. In some cases, generating a reply directly from the event feed may clear the corresponding event card from the event feed.

At operation 412, the process 400 can include launching/opening an application interface corresponding to the feed card. For example, in response to receiving the selection of the reply function, the mobile application may send an event notification of the reply selection and feed card information to the feed service, which may identify a corresponding application service, as described herein. The mobile application may use this information to launch an application interface for the application service associated with the event. For example, if the event included a comment to an issue, the mobile application may open an issue tracking application associated with the issue. In other examples, if the event includes a comment or edit to a collaborative document, the mobile application may open a collaborative document application.

At operation 414, the process 400 can include, displaying content details and generating a prep-populated response to the event. In some cases, this can include displaying a portion of the content associated with the event. For example, if the event was a comment to an issue, the mobile application may display an issue summary page for the issue. In some cases, the mobile application may display the portion of the issue that corresponds to the event, such as the comment section, as described herein.

The mobile application may also generate a pre-populated response to the event. For the comment to the issue, the mobile application may generate a response message that is addressed to the user that made the comment. In other cases, different type of events can generate different types of responses. For example, if the event was a change to the priority of an issue, the mobile application may prompt a user to approve or deny the change and send an event notification users selection to the user that made the change and/or other users associated with the issue. As another example, if the event was a proposed edit to a collaborative document, the response may prompt the user to accept or deny the proposed edit and/or comment on the proposed edit.

Figure 5:
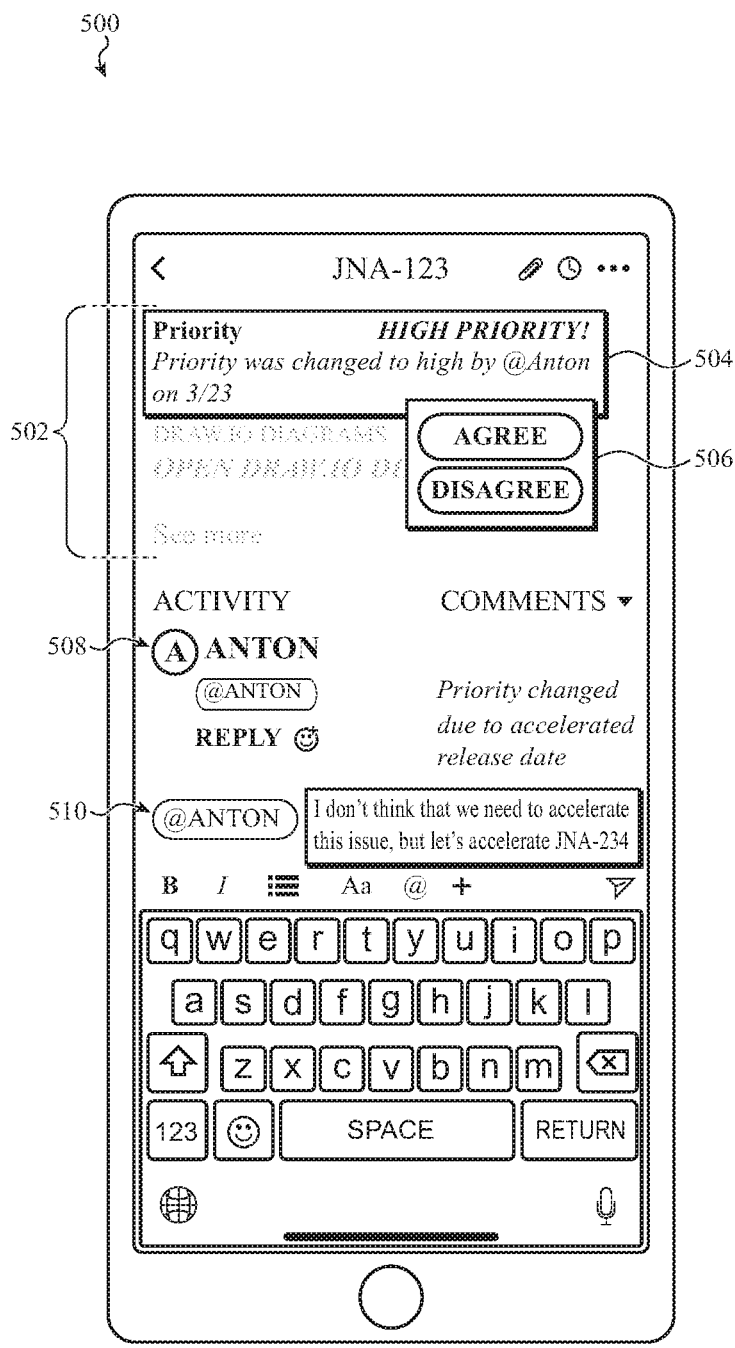
FIG. 5 shows an example of an issue details page including an automatically generated response with prepopulated users in response to a user activity.

FIG. 5 shows an example of an issue details page 500 that can be caused to automatically generate response with prepopulated users in response to a user activity in response to a user selecting an option to reply to a comment from an event card. The issue details page 500 may be an example of the issue details pages described herein, for example issue details page 320 described with reference to FIG. 3B.

The issue details page 500 may be displayed in response to a user selecting a reply option from a feed card as described herein. In the example illustrated in FIG. 5, the event may have been a change to the priority of the issue. The issue details page 500 can include issue details 502, which include the priority field 504. The priority field 504 may include items that indicate that it was updated, such as highlight, bold text, or any other suitable visual indictors. In some cases, the priority field 504 may include a summary of the event that includes details about the event, such as who updated it, when it was update and so on.

In some cases, the selecting a reply option from the event feed may cause one or more actions to be performed in the application platform (e.g., the issue tracking system). The type of event may determine which actions are performed. For example, in response to updating a priority of an issue, the issue tracking application may present a prompt 506 to the user, which provides one or more options for responding to the change in the priority. In this example, the prompt 506 may ask the user whether they agree with the change or disagree with the change. The user may select one of these options, which may be provided to the user that made the change to the priority. In some cases, multiple users associated with the issue may receive a prompt and their responses can be sent to the user the made the change. Additionally or alternatively, the system may aggregate the responses and send a summary to the user that made the change and/or other users. For example, the summary can indicate that four out of five users agree with the change.

The issue details page 500 may also include a comment field 508 that is associated with the event. For example, when a first user made the change, they may enter a comment that is associated with the change. This comment may be displayed in the corresponding feed card and the issue tracking system may display the comment in response to receiving a selection of a reply option from the feed card, as described herein. The system may cause the issue details page 500 to pre-populate a response 510 to the user that made suggested the change. In some cases, a user generating a reply may include other user in the response message. The original comment and the response/reply may each be associated with the issue, which may allow comments that pertain to specific events to be retrieved independent of other comments associated with the issue.

In some cases, the user may be able to respond to the prompt 506 and/or generate a reply comment within the event feed. For example, in response to selecting the reply option, the prompt 506 and/or pre-populated response 510 can be displayed in the comment feed interface.

Figure 6:
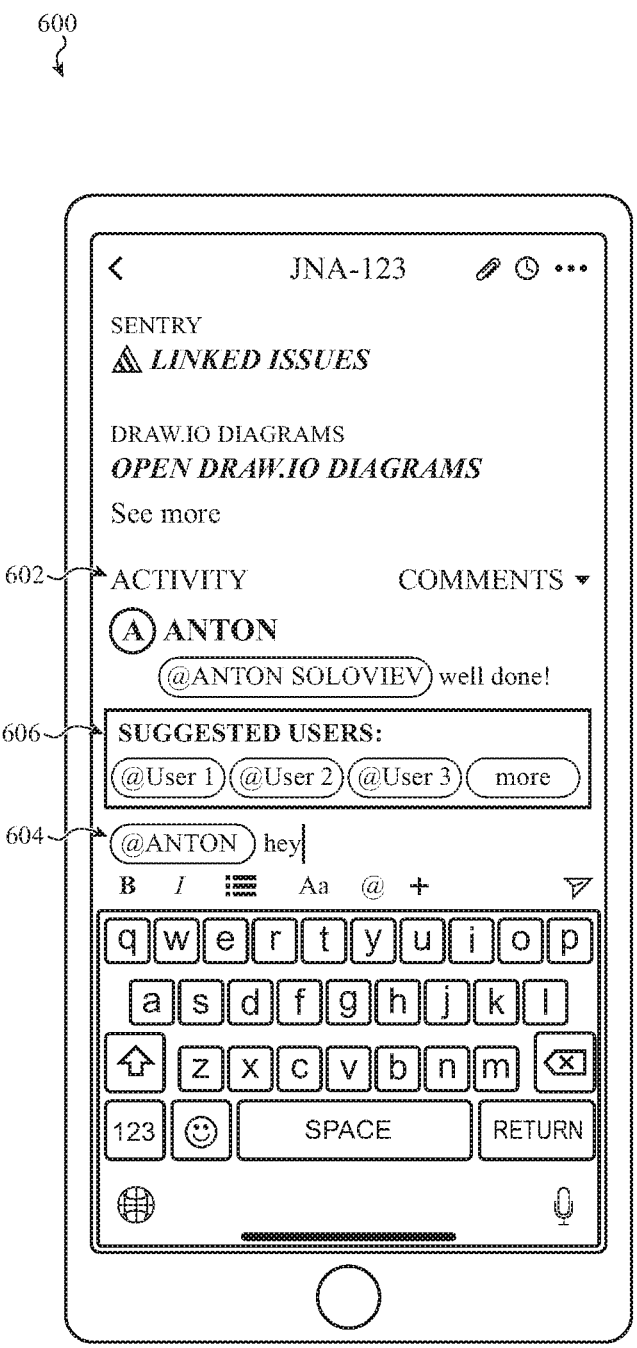
FIG. 6 shows an example of an issue details page include a comment interface that suggests users to include in a response comment.

FIG. 6 shows an example of an issue details page 600 include a comment interface that suggests one or more users to include in a response comment. The issue details page 600 may be generated and displayed in response to a user selecting a reply function in a feed card, as described herein. In the example illustrated in FIG. 6, the issue details page 600 can correspond to an issue managed by an issue tracking service.

The issue details page may include a comment section 602, as described herein, which is displayed in response to a specific type of event, for example, a comment on the corresponding issue. The comment section 602 can include a pre-populated response 604, which may include a reference to the user (e.g., @Anton) that made the comment, which cause the response to be sent to that user. In some cases, the comment section 602 may also generate a user suggestion interface 606, which may be used to select additional users to include in the response. In some cases, the user suggestion interface 606 can be populated with user associated with the issue, for example, members of the team assigned to the issue. In other cases, system may populate the user suggestion interface 606 with user references based a relevance of other users to the issue. For example, a suggested user may not be assigned to the current issue, but may be assigned to an issue that is dependent on the current issue. Accordingly, the system may determine that this issue is relevant to that user.

In other cases, the suggested user(s) may be determined based on data associated with the event. For example, the system can include a classifying function that assigns a classification to events generated by the system. A classification can include a type of problem being addresses, a skill set required, a connection to other issue, and so on. The system may include user(s) in the user suggestion interface 606 based on the classification. For example, the classifier may determine that the event is associated with a particular technical problem and identify user(s) who may have relevant skills to solve the issue. In this way, the user suggestion interface 606 may be able to suggest potentially relevant users that are not directly assigned to a particular issue and/or may not by directly known by one or more of the team members.

Figure 7:
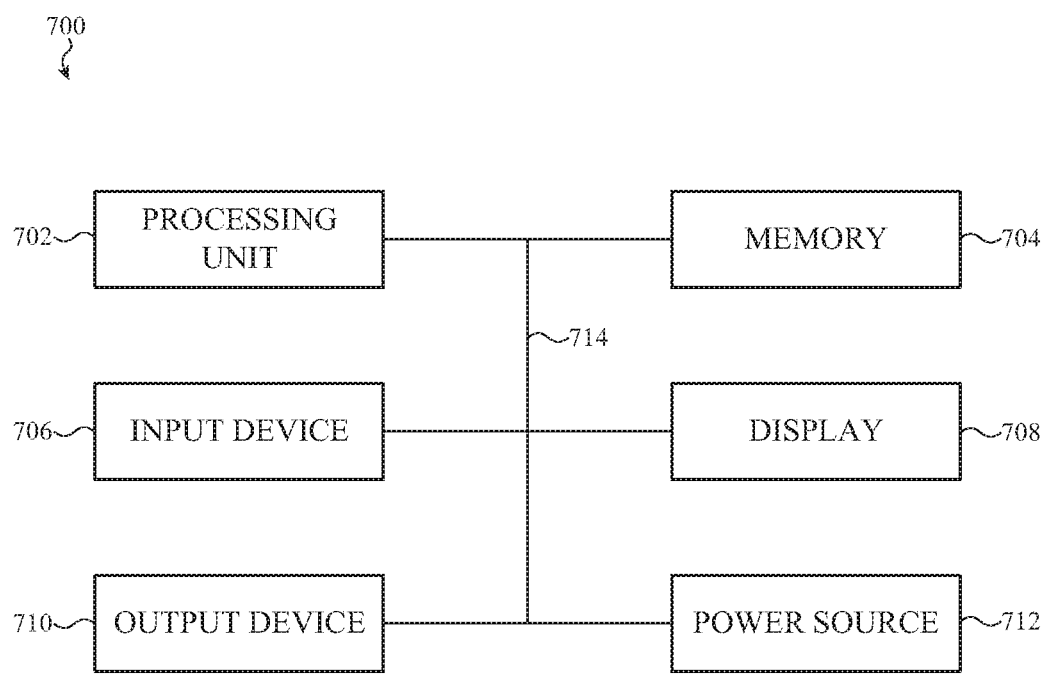
FIG. 7 shows a sample electrical block diagram of an electronic device that may perform the operations described herein.

FIG. 7 a sample electrical block diagram of an electronic device 700 that may perform the operations described herein. The electronic device 700 may in some cases take the form of any of the electronic devices described with reference to FIGS. 1-6, including client devices, and/or servers or other computing devices associated with the system 100. The electronic device 700 can include one or more of a processing unit 702, a memory 704 or storage device, input devices 706, a display 708, output devices 710a and power source 712. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally or alternatively, the power source 712 can be a power connector or power cord that connects the electronic device 700 to another power source, such as a wall outlet.

The memory 704 can store electronic data that can be used by the electronic device 700. For example, the memory 704 can store electronic data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example associated with an operating system, user interface, and/or applications of the electronic device 700 (e.g., a chat user interface, an issue-tracking user interface, an issue-discovery user interface, etc.). In one embodiment, the display 707 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed for leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated for leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for generating responses to an event displayed on a feed card, the method comprising:
receiving a set of event communications, each of at least a subset of the set of event communications corresponding to an event generated at a content collaboration system each event communication of the subset of event communications comprising object information for an object managed by the content collaboration system and event information comprising a description of the event;
rendering a set of event cards, each event card corresponding to an object managed by the content collaboration system, the rendering comprising:
identifying an event card of the set of event cards that includes a new comment entered for a corresponding object; and
generating, for the event card, a reply field comprising the new comment and an option to reply to the new comment;
in response to receiving a request to view an event feed from a client device associated with a user identification, cause the client device to display event cards of the set of event cards in the event feed, the event cards comprising the event card corresponding to the new comment;
in response to a first user selecting the option to reply to the new comment from the event card corresponding to the new comment:
cause the client device to launch an application of the content collaboration system; and
cause the client device to display object information and event information for the corresponding object in the content collaboration system.

2. The method of claim 1, further comprising, in response to the first user selecting the option to reply to the new comment, causing the content collaboration system to display the reply field for the corresponding object.

3. The method of claim 2, further comprising, in response to the first user selecting the option to reply to the new comment, causing the content collaboration system to generate a response in the reply field, the response prepopulated with an address for a second user associated with the corresponding object.

4. The method of claim 3, wherein the second user is a user that entered the new comment into the reply field for the corresponding object.

5. The method of claim 3, further comprising, in response to generating the response in the reply field, displaying an option to add one or more additional users to the response, the one or more additional users associated with the corresponding object.

6. The method of claim 3, further comprising, in response to the first user sending the response:
receiving an event communication corresponding to the response;
causing the event feed to be updated in accordance with the event communication; and
causing the client device to display an updated event feed.

7. The method of claim 1, wherein:
the content collaboration system comprises an issue tracking service;
the issue tracking service is configured to manage a set of issues associated with a project; and
each issue of the set of issues is configured to change from a first state to a second state.

8. The method of claim 7, wherein one or more of the event communications is generated in response to a respective issue changing from the first state to the second state.

9. A method for generating automated responses to event feed items in a multiplatform collaboration system, the method comprising:
receiving a set of event communications, each event communication corresponding to an event generated at a respective application service of a set of applications services, each event communication comprising content information for a content item associated with the event and event information comprising an update to a corresponding content item;
rendering a set of event cards, each event card corresponding to a content item generated at the respective application service, each event card comprising content information and event information, the rendering comprising:
identifying an event card of the set of event cards corresponding to an event that comprises a new comment; and
generating, for the event card, a reply field comprising the new comment and an option to reply to the new comment;
in response to receiving a request to view an event feed from a client device associated with a user identification, cause the client device to display event cards of the set of event cards associated with the user identification in the event feed;
in response to a first user selecting the option to reply to the new comment from the event card, generate a response interface comprising a response comment, the response comment prepopulated with a response address for a second user associated with the content item.

10. The method of claim 9, further comprising, in response to the first user selecting the option to reply to the new comment from the event card:
identifying the respective application service associated with the content item;
causing the client device to launch an application platform associated with the application service; and
causing the client device to display the content information and event information for the content item in the application platform.

11. The method of claim 9, wherein the respective application service comprises one of an issue tracking servicer, a collaborative documents service, or a codebase system.

12. The method of claim 9, wherein causing the client device to display the event cards of the set of event cards comprises:
identifying a user associated with the new comment of the content item; and
displaying the user identification in the event card and associated with the new comment.

13. The method of claim 9, further comprising:
- identifying one or more additional users associated with the content item; and
- in response to the first user selecting the option to reply to the new comment from an event card, causing the client device to suggest adding the one or more additional users to the response comment.

14. The method of claim 13, wherein suggesting adding the one or more additional users comprises displaying a field in the response comment comprising references associated with each of the one or more additional users.

15. The method of claim 14, wherein the references associated with each of the one or more additional users each comprises a special symbol followed by the user identification associated with a corresponding user.

16. The method of claim 9, wherein rendering the set of event cards comprises rendering a comment chain for the corresponding content item and an indication of each user associated with a corresponding comment in the comment chain.

17. A method for generating automated responses to an object displayed on a feed card of an event feed, the method comprising:
- receiving a set of event communications, each event communication corresponding to an event generated at a service of a content collaboration system, each event communication comprising object information for an object associated with the event and event information comprising a change to a corresponding object;
- rendering a set of event cards, each event card corresponding to an object managed by a service of the content collaboration system, each event card comprising object information and event information, the rendering comprising:
  - identifying an event card of the set of event cards corresponding to an event that comprises a comment entered in a comment field of the corresponding object; and
  - generating, for the event card, a reply field comprising the comment and an option to reply to the comment;
- in response to receiving a request to view an event feed from a client device associated with a user identification, cause the client device to display event cards of the set of event cards in the event feed;
- in response to a first user selecting the option to reply to the comment from the event card of the displayed event cards cause the client device to display a response interface comprising a response to the comment.

18. The method of claim 17, further comprising, in response to the first user selecting the option to reply to the comment from an event card, causing the response interface to be opened in a corresponding service of the content collaboration system, the response interface prepopulated with an address for a second user associated with the object.

19. The method of claim 18, further comprising, in response to the first user posting the response to the comment:
- receiving an event notification of the response; and
- updating the event card for the object in accordance with the event notification.

20. The method of claim 18, wherein the corresponding service comprises one of an issue tracking service, a collaborative document service or a codebase service.

* * * * *